US010730961B2

(12) United States Patent
Yukimura

(10) Patent No.: US 10,730,961 B2
(45) Date of Patent: Aug. 4, 2020

(54) PROCESSES FOR PREPARING FUNCTIONAHZED POLYMERS, RELATED FUNCTIONALIZING COMPOUND AND PREPARATION THEREOF

(71) Applicant: Bridgestone Corporation, Chuo-ku (JP)

(72) Inventor: Noriaki Yukimura, Copley, OH (US)

(73) Assignee: Bridgestone Corporation, Chuo-ku (JP)

( * ) Notice: Subject to any disclaimer, the term of this patent is extended or adjusted under 35 U.S.C. 154(b) by 200 days.

(21) Appl. No.: 15/748,409

(22) PCT Filed: Jul. 28, 2016

(86) PCT No.: PCT/US2016/044517
§ 371 (c)(1),
(2) Date: Jan. 29, 2018

(87) PCT Pub. No.: WO2017/019878
PCT Pub. Date: Feb. 2, 2017

(65) Prior Publication Data
US 2018/0223007 A1 Aug. 9, 2018

Related U.S. Application Data

(60) Provisional application No. 62/198,304, filed on Jul. 29, 2015.

(51) Int. Cl.
| | | |
|---|---|---|
| *C08C 19/25* | (2006.01) | |
| *C08L 15/00* | (2006.01) | |
| *C08C 19/44* | (2006.01) | |
| *C08F 236/06* | (2006.01) | |
| *C07F 7/10* | (2006.01) | |
| *C07F 7/18* | (2006.01) | |
| *C07F 7/08* | (2006.01) | |

(52) U.S. Cl.
CPC .............. *C08C 19/25* (2013.01); *C08C 19/44* (2013.01); *C08F 236/06* (2013.01); *C08L 15/00* (2013.01); *C07F 7/0816* (2013.01); *C07F 7/10* (2013.01); *C07F 7/18* (2013.01); *C07F 7/188* (2013.01)

(58) Field of Classification Search
CPC . C08C 19/25; C08C 19/44; C07F 7/10; C07F 7/0816; C07F 7/18; C07F 7/188
See application file for complete search history.

(56) References Cited

U.S. PATENT DOCUMENTS

| | | | |
|---|---|---|---|
| 3,524,900 A | 8/1970 | Gibbon | |
| 3,994,948 A * | 11/1976 | Jayne | C10M 3/00 |
| | | | 556/443 |
| 4,138,379 A * | 2/1979 | Scott | C08K 5/549 |
| | | | 524/114 |
| 5,066,721 A | 11/1991 | Hamada et al. | |
| 5,210,246 A | 5/1993 | Tanaka et al. | |
| 5,508,333 A | 4/1996 | Shimizu | |
| 5,717,022 A | 2/1998 | Beckmann et al. | |
| 5,952,779 A | 9/1999 | Arai et al. | |
| 6,008,295 A | 12/1999 | Takeichi et al. | |
| 6,294,624 B1 | 9/2001 | Inoue et al. | |
| 6,313,210 B1 | 11/2001 | Lin et al. | |
| 6,482,912 B2 | 11/2002 | Boudjouk et al. | |
| 7,449,537 B2 | 11/2008 | Boudjouk et al. | |
| 7,498,293 B2 | 3/2009 | Piccinelli et al. | |
| 7,981,966 B2 | 7/2011 | Kobayashi et al. | |
| 8,067,522 B2 | 11/2011 | Ludewig et al. | |
| 8,088,940 B2 * | 1/2012 | Huang | C07F 7/1804 |
| | | | 556/464 |
| 8,093,323 B2 | 1/2012 | Saiki et al. | |
| 8,148,486 B2 | 4/2012 | Hogan et al. | |
| 8,399,562 B2 | 3/2013 | Hogan et al. | |
| 2004/0266968 A1 * | 12/2004 | Korth | C08K 5/548 |
| | | | 528/30 |
| 2007/0185267 A1 | 8/2007 | Kobayashi et al. | |
| 2008/0171827 A1 | 7/2008 | Hogan et al. | |
| 2009/0203826 A1 | 8/2009 | Rachita et al. | |
| 2009/0221751 A1 * | 9/2009 | Hasse | C08K 5/548 |
| | | | 525/102 |

(Continued)

FOREIGN PATENT DOCUMENTS

| | | |
|---|---|---|
| CA | 1276162 C | 11/1990 |
| DE | 10-2011077201 A1 | 12/2012 |

(Continued)

OTHER PUBLICATIONS

International Search Reported from PCT application PCT/US2016/044517, dated Oct. 31, 2016.
International Preliminary Report on Patentability from PCT application PCT/US2016/044517, dated Jan. 30, 2018.
Extended European Search Report and Search Opinion from EP application 16831361, dated Mar. 15, 2019.
"Silane Coupling Agents: Connecting Across Boundaries" published by Gelest, Inc., copyright 2006 (76 pages).
Schindler, Wolfram, "Alpha-Silane-Terminated Polymers as Novel Binders for Fast Curing Elastic Adhesives," copyright 2005.

(Continued)

*Primary Examiner* — Margaret G Moore
(74) *Attorney, Agent, or Firm* — Meredith E. Hooker; Jenny L. Sheaffer

(57) ABSTRACT

Disclosed herein are processes for preparing functionalized polymers, functionalizing compounds useful in the processes and processes for preparing the functionalizing compound. The processes for preparing a functionalized polymer include reaction of a functionalizing compound (prepared from the reaction of an alkoxysilane compound of formula (I) with a polyol of formula (II)) with a reactive conjugated diene monomer-containing polymer, thereby producing a polymer end functionalized with the functionalizing compound. In certain embodiments, the functionalizing compound has a formula according to formula (III), (IV), or (V).

19 Claims, No Drawings

(56) References Cited

U.S. PATENT DOCUMENTS

| | | |
|---|---|---|
| 2010/0120950 A1 | 5/2010 | Saiki |
| 2012/0065319 A1 | 3/2012 | Backer et al. |
| 2012/0165476 A1 | 6/2012 | Hogan et al. |
| 2013/0167754 A1 | 7/2013 | Wassmer et al. |
| 2014/0357795 A1 | 4/2014 | McCauley et al. |
| 2014/0120354 A1 | 5/2014 | Peiffer et al. |
| 2014/0190369 A1 | 7/2014 | Peiffer et al. |
| 2015/0148477 A1 | 5/2015 | Ma et al. |

FOREIGN PATENT DOCUMENTS

| | | |
|---|---|---|
| DE | 10-2011077213 A1 | 12/2012 |
| EP | 1721930 A1 | 11/2006 |
| EP | 1854839 A1 | 11/2007 |
| EP | 1509533 B1 | 10/2009 |
| EP | 2325211 B1 | 10/2012 |
| JP | 2010-270212 A | 12/2010 |
| JP | 52-97888 B2 | 9/2013 |
| KR | 10-1527789 B1 | 6/2015 |
| RU | 2235740 C2 | 9/2004 |
| WO | 2010-125124 A1 | 11/2010 |
| WO | 2013-086480 A2 | 6/2013 |

OTHER PUBLICATIONS

Zhao, W., et al., "Organocatalysis by hydrogen-bonding: a new approach to controlled/living polymerization of alpha-amino acid N-carboxyanhydrides," Polymer Chemistry, vol. 6 No. 34, Jul. 2015, pp. 6193-6201.

* cited by examiner

PROCESSES FOR PREPARING FUNCTIONALIZED POLYMERS, RELATED FUNCTIONALIZING COMPOUND AND PREPARATION THEREOF

FIELD

The present application is directed to processes for preparing functionalized polymers, to a related functionalizing compound useful in the processes and to processes for preparing the functionalizing compound.

BACKGROUND

Functionalized polymers, particularly those functionalized with silicon in combination with one or more heteroatoms, may provide reduced rolling resistance (hysteresis) in silica-filled rubber compositions. The use of such functionalized polymers in rubber compositions used for tire treads may result in a desirable decrease in rolling resistance (hysteresis).

SUMMARY

Disclosed herein are processes for preparing functionalized polymers, functionalizing compounds useful in the processes and processes for preparing the functionalizing compound.

In a first embodiment, a process for preparing a functionalized polymer is disclosed. The process comprises: (a) pre-reacting an alkoxysilane compound of formula (I) with a polyol of formula (II), to produce a functionalizing compound containing at least two —O—Si—O— moieties, and (b) reacting the functionalizing compound with a reactive conjugated diene monomer-containing polymer, thereby producing a polymer end functionalized with the functionalizing compound. According to the process, formulas (I) and (II) are as follows:

$(R^1)_{4-x}Si(OR^2)_x$      (I)

$(R^3)(OH)_y$      (II)

and each $R^1$ is independently selected from a halogen atom, and a monovalent organic group optionally substituted with at least one heteroatom, each $R^2$ is independently selected from hydrogen and a monovalent organic group, x is an integer from 2 to 4, $R^3$ is a multivalent organic group optionally substituted with at least one heteroatom, and y is an integer of at least 3.

In a second embodiment, a process is disclosed for preparing a functionalized polymer. The process comprises: (a) providing a functionalizing compound having a formula (III), (IV), or (V) as follows, and (b) reacting the functionalizing compound with a reactive conjugated diene-monomer containing polymer, thereby producing a polymer end functionalized with the functionalizing compound. According to the process, formulas (III), (IV), and (V) are as follows:

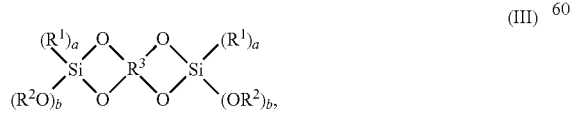

(III)

wherein a is an integer selected from 0 or 1, b is an integer selected from 1 or 2 and a+b=2,

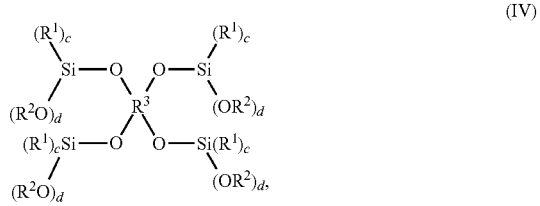

(IV)

wherein c is an integer selected from 0 or 1, d is an integer selected from 1, 2 or 3, and c+d=3

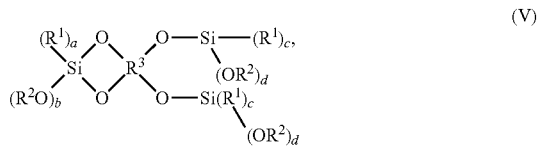

(V)

wherein a is an integer selected from 0 or 1, b is an integer selected from 1 or 2, a+b=2, c is an integer selected from 0 or 1, d is an integer selected from 1 or 2, and c+d=3.

In a third embodiment, a process is disclosed for preparing a functionalizing compound. The process comprises reacting an alkoxysilane compound of formula (I) with a polyol of formula (II), to produce a functionalizing compound containing at least two —O—Si—O— moieties. According to the process, formulas (I) and (II) are as follows:

$(R^1)_{4-x}Si(OR^2)_x$      (I)

$(R^3)(OH)_y$      (II)

wherein each $R^1$ is independently selected from a halogen atom, and a monovalent organic group optionally substituted with at least one heteroatom, each $R^2$ is independently selected from hydrogen and a monovalent organic group, x is an integer from 2 to 4, $R^3$ is a multivalent organic group optionally substituted with at least one heteroatom, and y is an integer of at least 3.

In a fourth embodiment, a polymer functionalizing compound comprising the reaction product of an alkoxysilane compound of formula (I) with a polyol of formula (II) is disclosed. Formulas (I) and (II) are as follows:

$(R^1)_{4-x}Si(OR^2)_x$      (I)

$(R^3)(OH)_y$      (II)

wherein each $R^1$ is independently selected from a halogen atom, and a monovalent organic group optionally substituted with at least one heteroatom, each $R^2$ is independently selected from hydrogen and a monovalent organic group, x is an integer from 2 to 4, $R^3$ is a multivalent organic group optionally substituted with at least one heteroatom, and y is an integer of at least 3.

DETAILED DESCRIPTION

Disclosed herein are processes for preparing functionalized polymers, functionalizing compounds useful in the processes and processes for preparing the functionalizing compound.

In a first embodiment, a process for preparing a functionalized polymer is disclosed. The process comprises: (a) pre-reacting an alkoxysilane compound of formula (I) with a polyol of formula (II), to produce a functionalizing compound containing at least two —O—Si—O— moieties, and (b) reacting the functionalizing compound with a reactive conjugated diene monomer-containing polymer, thereby producing a polymer end functionalized with the functionalizing compound. According to the process, formulas (I) and (II) are as follows:

and each $R^1$ is independently selected from a halogen atom, and a monovalent organic group optionally substituted with at least one heteroatom, each $R^2$ is independently selected from hydrogen and a monovalent organic group, x is an integer from 2 to 4, $R^3$ is a multivalent organic group optionally substituted with at least one heteroatom, and y is an integer of at least 3.

In a second embodiment, a process is disclosed for preparing a functionalized polymer. The process comprises: (a) providing a functionalizing compound having a formula (III), (IV), or (V) as follows, and (b) reacting the functionalizing compound with a reactive conjugated diene-monomer containing polymer, thereby producing a polymer end functionalized with the functionalizing compound. According to the process, formulas (III), (IV), and (V) are as follows:

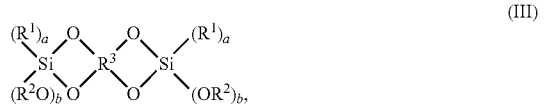

wherein a is an integer selected from 0 or 1, b is an integer selected from 1 or 2 and a+b=2,

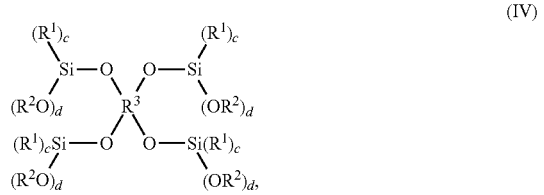

wherein c is an integer selected from 0 or 1, d is an integer selected from 1, 2 or 3, and c+d=3

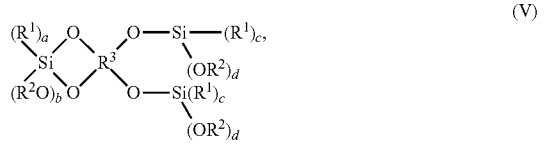

wherein a is an integer selected from 0 or 1, b is an integer selected from 1 or 2, a+b=2, c is an integer selected from 0 or 1, d is an integer selected from 1 or 2, and c+d=3.

In a third embodiment, a process is disclosed for preparing a functionalizing compound. The process comprises reacting an alkoxysilane compound of formula (I) with a polyol of formula (II), to produce a functionalizing compound containing at least two —O—Si—O— moieties. According to the process, formulas (I) and (II) are as follows:

wherein each $R^1$ is independently selected from a halogen atom, and a monovalent organic group optionally substituted with at least one heteroatom, each $R^2$ is independently selected from hydrogen and a monovalent organic group, x is an integer from 2 to 4, $R^3$ is a multivalent organic group optionally substituted with at least one heteroatom, and y is an integer of at least 3.

In a fourth embodiment, a polymer functionalizing compound comprising the reaction product of an alkoxysilane compound of formula (I) with a polyol of formula (II) is disclosed. Formulas (I) and (II) are as follows:

wherein each $R^1$ is independently selected from a halogen atom, and a monovalent organic group optionally substituted with at least one heteroatom, each $R^2$ is independently selected from hydrogen and a monovalent organic group, x is an integer from 2 to 4, $R^3$ is a multivalent organic group optionally substituted with at least one heteroatom, and y is an integer of at least 3.

Definitions

The terminology as set forth herein is for description of the embodiments only and should not be construed as limiting the invention as a whole.

Unless otherwise indicated, the terms "alkyl" and "alkyl group" are used interchangeably herein to refer to a monovalent group derived from an alkane by removal of a hydrogen atom from any carbon atom. Generally, the terms should be understood to include both branched and linear/unbranched structures.

Unless otherwise indicated, the terms "cycloalkyl" and "cycloalkyl group" are used interchangeably herein to refer to a monovalent group derived from a cycloalkane by removal of a hydrogen atom from a ring carbon atom. Similarly, the terms "cycloalkenyl" and "cycloalkenyl group" are used herein to refer to a monovalent group derived from a cycloalkene by removal of a hydrogen from a ring carbon atom.

Unless otherwise indicated, the terms "alkenyl" and "alkenyl group" are used interchangeably herein to refer to a monovalent group derived from an alkene by removal of a hydrogen atom from any carbon atom. Generally, the terms should be understood to include both branched and linear/unbranched structures.

Unless otherwise indicated, the terms "alkynyl" and "alkynyl group" are used interchangeably herein to refer to a monovalent group derived from an alkyne by removal of a hydrogen atom from any carbon atom. Generally, the terms should be understood to include both branched and linear/unbranched structures.

Unless otherwise indicated, the terms "aryl" and "aryl group" are used interchangeably herein to refer to a monovalent group derived from an aromatic compound by removal of a hydrogen atom from the aromatic compound.

Unless otherwise indicated, the term "organic group" is used herein to refer to a group formed by removing one or more hydrogen atoms from a hydrocarbon. The term "hydrocarbon" is used herein to refer to a compound containing a carbon backbone and formed from hydrogen and carbon, although as discussed further herein certain of the organic groups herein may be substituted with (i.e., contain or comprise) one or more heteroatoms.

As used herein, the phrases "functionalized polymer" and "functional polymer" as well as related terms such as functionalizing and functionalized are meant to encompass polymers having at least one functional group bonded to the end of a polymer chain. As described further herein, the at least one functional group according to the first and second embodiments described (as added by the functionalizing compound according to the second and third embodiments disclosed herein) herein contains silicon and the end of the polymer chain is directly bonded to at least one silicon of the functional group.

As used herein, the term polymer is meant to encompass both polymers (i.e., containing repeating units from one monomer) and copolymers (i.e., containing repeating units from two or more monomers).

As used herein, the term "reactive" (e.g., reactive conjugated diene monomer containing polymer) is used to refer to a polymer species having a living end that has not yet been terminated; the living end is capable of reacting with a functional group and, thus, can be described as reactive.

Processes for Preparing a Functionalized Polymer

As discussed above, the first and second embodiments disclosed herein are directed to processes for preparing a functionalized polymer. According to the first embodiment, the process comprises: (a) pre-reacting an alkoxysilane compound of formula (I) with a polyol of formula (II), to produce a functionalizing compound containing at least two —O—Si—O— moieties, and (b) reacting the functionalizing compound with a reactive conjugated diene monomer-containing polymer, thereby producing a polymer end functionalized with the functionalizing compound. According to the second embodiment, the process comprises: (a) providing a functionalizing compound having a formula (III), (IV), or (V) as follows, and (b) reacting the functionalizing compound with a reactive conjugated diene-monomer containing polymer, thereby producing a polymer end functionalized with the functionalizing compound. As should be apparent from an examination of formulas (III), (IV), and (V), the functionalizing compound contains at least two —O—Si—O— moieties which can be understood as comprising the —O—Si(OR²) moiety or moieties wherein a Si appears bonded to two O. According to the processes of the first and second embodiments disclosed herein, the functionalizing compound is added to the vessel or container which contains the reactive conjugated diene-monomer containing polymer. In certain embodiments of the first and second embodiment, the functionalizing compound is added once a peak polymerization temperature (which is indicative of nearly complete monomer conversion) is observed. Because reactive ends of the polymer may self-terminate, in one or more embodiments of the first and second embodiments, the functionalizing compound may be added after peak polymerization temperature is reached, e.g., within about 25 to 35 minutes of the peak polymerization temperature.

The polymer produced according to the processes of the first and second embodiments disclosed herein can be described as an end functionalized polymer or a tail functionalized polymer. The end that is functionalized using the functionalizing compounds described herein being the tail end or the chain end nearest the location where the final monomer unit has been added to the polymer. The other end of the polymer can be referred to as its head and constitutes the chain end where initiator residue resides. In certain embodiments of the first and second embodiments disclosed herein, the end functionalized polymer that is produced is functionalized only at its tail end, i.e., it does not contain any functional group at its head. In other embodiments of the first and second embodiments disclosed herein, the end functionalized polymer is functionalized at its tail end with a functional group resulting from the functionalizing compound described herein and is also functionalized at its head end with a functional group from use of a functionalized initiator; in certain such embodiments, the functional group from use of a functionalized initiator lacks any silicon.

Alkoxysilane Compound

As discussed above, according to the first and second embodiments disclosed herein, an alkoxysilane compound having formula (I), as follows is utilized:

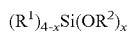

$$(R^1)_{4-x}Si(OR^2)_x \quad (I).$$

According to formula (I), each $R^1$ is independently selected from a halogen atom, and a monovalent organic group optionally substituted with at least one heteroatom, each $R^2$ is independently selected from hydrogen and a monovalent organic group, x is an integer from 2 to 4, $R^3$ is a multivalent organic group optionally substituted with at least one heteroatom, and y is an integer of at least 3. By stating that x is an integer from 2 to 4 means that the alkoxysilane compound according to formula (I) will contain 2 to 4 alkoxygroups and/or OH groups. In certain embodiments of the first and second embodiments, x is 2. In certain embodiments of the first and second embodiments, x is 3. In certain embodiments of the first and second embodiments, x is 4. As discussed herein, the alkoxysilane compound having formula (I) is utilized in conjunction with a polyol having formula (II), and in certain embodiments, at least one $R^1$, $R^3$, or a combination thereof contains at least one nitrogen (e.g., one nitrogen, two nitrogens, or more); in certain such embodiments at least one of the following is met: (a) at least one $R^1$ contains one nitrogen or at least two nitrogens, (b) the alkoxysilane compound of formula (I) contains one nitrogen, two nitrogens, or more, or (c) the polyol compound of formula (II) contains one nitrogen, two nitrogens, or more (i.e., within $R^3$).

In certain embodiments of the first and second embodiments, $R^1$ comprises a halogen atom selected from chlorine, fluorine, bromine, and iodine. In certain embodiments of the first and second embodiments, $R^1$ comprises a monovalent organic group optionally substituted with at least one heteroatom (e.g., O, N, S); in certain such embodiments each monovalent organic group comprises 1-18 carbon atoms, preferably 1-12 carbon atoms.

In certain embodiments of the first and second embodiments, $R^1$ comprises an alkyl group (linear or branched) having 1-18 carbon atoms, a cycloalkyl group having 3-10 carbon atoms, an aryl group having 6-18 carbon atoms, a heteroaryl group having 4-13 carbon atoms, an alkenyl group having 2-18 carbon atoms, a cycloalkenyl group having 3-10 carbon atoms, or an epoxy group having 2 to 10 carbon atoms. In certain embodiments of the first and second embodiments, $R^1$ comprises a monovalent organic group substituted with at least one heteroatom; in certain such embodiments the at least one heteroatom is selected from O, N, S, and combinations thereof.

In certain embodiments of the first and second embodiments, each $OR^2$ comprises an alkoxygroup. In certain embodiments of the first and second embodiments, each $R^2$ comprises a monovalent organic group comprising 1-18 carbon atoms, preferably 1-12 carbon atoms. In certain embodiments of the first and second embodiments, each OR² comprises methoxy, ethoxy, or a combination thereof.

In certain embodiments of the first and second embodiments, at least one monovalent organic group of R¹ or R² comprises an alkyl, cycloalkyl, substituted cycloalkyl, alkenyl, cycloalkenyl, substituted cycloalkenyl, aryl, allyl, substituted aryl, araalkyl, alkaryl, alkynyl, or epoxy.

Examples of alkoxysilane compounds according to formula (I) include tetraalkoxysilanes, alkylalkoxysilanes, arylalkoxysilanes, alkenylalkoxysilanes, haloalkoxysilanes, and combinations thereof. In certain embodiments of the first and second embodiments, a combination of one or more types of the foregoing alkoxysilane compounds is utilized. In certain embodiments of the first and second embodiments, one type of the foregoing alkoxysilane compounds is utilized. In certain embodiments of the first and second embodiments, more than one alkoxysilane compound is utilized.

Examples of tetraalkoxysilanes compounds include, but are not limited to, include tetramethyl orthosilicate, tetraethyl orthosilicate, tetrapropyl orthosilicate, tetrabutyl orthosilicate, tetra(2-ethylhexyl) orthosilicate, tetraphenyl orthosilicate, tetratoluyloxysilane, and combinations thereof.

Examples of alkyalkoxysilane compounds include, but are not limited to, methyltrimethoxysilane, methyltriethoxysilane, methyltri-n-propoxysilane, methyltri-n-butoxysilane, methyltriphenoxysilane, ethyl trimethoxysilane, ethyltriethoxysilane, ethyltri-n-propoxysilane, ethyltri-n-butoxysilane, ethyltriphenoxysilane, dimethyldimethoxysilane, dimethyldiethoxysilane, dimethyldi-n-propoxysilane, dimethyldi-n-butoxysilane, dimethyldiphenoxysilane, diethyldimethoxysilane, diphenyldimethoxysilane, 3-glycidoxypropyltrimethoxysilane (GPMOS), α-methacryloxy propyl trimethoxysilane, N,N-bis trimethylsilylaminopropylmethyldiethoxysilane, and combinations thereof.

Examples of arylalkoxysilane compounds include, but are not limited to, phenyltrimethoxysilane, phenyltriethoxysilane, phenyltri-n-propoxysilane, phenyltri-n-butoxysilane, phenyltriphenoxysilane, and combinations thereof.

Examples of alkenylalkoxysilanes include, but are not limited to, vinyltrimethoxysilane, vinyltriethoxysilane, vinyltri-n-propoxysilane, vinyltri-n-butoxysilane, vinyltriphenoxysilane, allyltrimethoxysilane, octenyltrimethoxysilane, divinyldimethoxysilane, and combinations thereof.

Examples of haloalkoxysilane compounds include, but are not limited to, trimethoxychlorosilane, triethoxychlorosilane, tri-n-propoxychlorosilane, tri-n-butoxychlorosilane, triphenoxychlorosilane, dimethoxydichlorosilane, diethoxydichlorosilane, di-n-propoxydichlorosilane, diphenoxydichlorosilane, methoxytrichlorosilane, ethoxytrichlorosilane, n-propoxytrichlorosilane, phenoxytrichlorosilane, trimethoxybromosilane, triethoxybromosilane, tri-n-propoxybromosilane, triphenoxybromosilane, dimethoxydibromosilane, diethoxydibromosilane, di-n-propoxydibromosilane, diphenoxydibromosilane, methoxytribromosilane, ethoxytribromosilane, n-propoxytribromosilane, phenoxytribromosilane, trimethoxyiodosilane, triethoxyiodosilane, tri-n-propoxyiodosilane, triphenoxyiodosilane, dimethoxydiiodosilane, di-n-propoxydiiodosilane, diphenoxydiiodosilane, methoxytriiodosilane, ethoxytriiodosilane, n-propoxytriiodosilane, phenoxytriiodosilane, and combinations thereof.

Polyol

As discussed above, according to the first and second embodiments, a polyol having formula (II) as follows is utilized:

$$(R^3)(OH)_y \qquad (II).$$

According to formula (II), R³ is a multivalent organic group optionally substituted with at least one heteroatom, and y is an integer of at least 3. By stating that y is an integer of at least 3 is meant that the polyol compound according to formula (II) contains at least three —OH groups. As can be appreciated by a review of formula (I) including the definition of R³, the position of the at least three —OH groups may vary depending upon the particular structure of R³ selected. For example when R³ comprises a diamine, both nitrogen therein may share a divalent organic group and each nitrogen may itself contain one or two organic groups (with a total of at least three (and preferably all four) having an —OH group at its end).

In certain embodiments of the first and second embodiments, y is no more than 8; in other words, in certain embodiments y is an integer of 3 to 8.

In certain embodiments of the first and second embodiments, R³ is a multivalent organic group containing 3-46 carbon atoms, optionally substituted with at least one heteroatom. In certain embodiments of the first and second embodiments, R³ contains at least one heteroatom selected from N, O and S; in certain such embodiments R³ contains at least one N. In certain embodiments of the first and second embodiments, R³ comprises a diamine and the polyol has the formula $[(OH)_qR^4]_r(R^7)_pNR^5N(R^8)_s[R^6(OH)_t]_u$, wherein R⁴, R⁶, R⁷, and R⁸, are independently selected from multivalent organic groups optionally substituted with at least one heteroatom; R⁵ is a multivalent organic group optionally substituted with at least one heteroatom; q and t are each an integer independently selected from 1 to 3; p, r, s and u are each an integer independently selected from 0, 1 or 2; r and p total 2; s and u total 2; and the total of all (OH) present is at least 3. In certain embodiments of the first and second embodiments, R⁴, R⁶, R⁷ and R⁸ each independently comprising a multivalent organic group having 1-18 carbons, preferably 1-6 carbons, and R⁵ comprises a multivalent organic group having 1 to 10 carbons optionally substituted with at least one heteroatom. In certain embodiments of the first and second embodiments, R⁴ and R⁶ can be the same or different but are preferably the same and/or R⁷ and R⁸ can be the same or different but are preferably the same. In certain embodiments of the foregoing, p and s both=0, r and u both=2, and q and t both=1, resulting in a diamine polyol having a divalent organic group between the two nitrogens, with each nitrogen also bonded to two organic groups each ending in an —OH. In certain embodiments of the first and second embodiments, R⁵ comprises at least one additional N (e.g., 1, 2, or more), thus having at least one group of the following formula $[(OH)_qR^4]_r(R^7)_p$— and/or —$(R^8)_s[R^6(OH)_t]_u$ (wherein R⁴, R⁶, R7 and R⁸ as well as p, q, r, s, t and u are as defined above) bonded to a carbon within the R⁵. In certain embodiments of the first and second embodiments, y is no more than 8 such that the polyol or diamine polyol has no more than 8 OH groups in total; in other words, in certain embodiments y is an integer of 3 to 8.

In certain embodiments of the first-fourth embodiments disclosed herein, the polyol is a diamine polyol (i.e., R³ comprises or contains a diamine) and the polyol has the formula $[(OH)R^4]_2NR^5N[R^6(OH)]_2$ and R⁵ comprises a divalent organic group having 1-10 carbons, preferably 1-6 carbons, each of R⁴ and R⁶ comprises a divalent organic group having 1-18 carbons, preferably 1-6 carbons and q=1.

Various polyols according to formula (II), including diamine polyols meeting the above formula, are commercially available from sources such as Sigma-Aldrich Co., LLC (St. Louis, Mo.). Non-limiting examples of diamine polyols include N,N,N',N'-Tetrakis(2-hydroxypropyl)ethylenediamine, N,N,N',N'-Tetrakis(2-hydroxyethyl)ethylenediamine, N,N,N',N'-Tetrakis(1-hydroxypropyl)ethylenediamine.

Functionalizing Compound

As should be apparent from the discussion herein, the functionalized polymers discussed herein (and produced according to the processes of the first and second embodiments as well as those polymers according to the fourth embodiment) contain at least one functional group, where that functional group is added by a functionalizing compound produced by reacting an alkoxysilane compound of formula (I) with a polyol of formula (II). The meaning and structures of the alkoxysilane compound of formula (I), the polyol of formula (II) as well as the resulting functionalizing compound are as discussed above in preceding sections and should be considered to be fully applicable to the third and fourth embodiments disclosed herein as it fully set forth within the present section. The functionalizing compound produced by reacting an alkoxysilane compound of formula (I) with a polyol of formula (II) reacts with a reactive conjugated diene monomer-containing polymer to produce a polymer end functionalized with the functionalizing compound. The functionalizing group is bonded to the end of the polymer through a silicon, which bonding takes place by removal of an alkoxy group from that silicon. When the functionalizing compound contains a silicon with more than one alkoxy moiety, it is possible for more than one reactive conjugated diene monomer-containing polymer to bond to that silicon.

Reactive Conjugated Diene Monomer-Containing Polymer

As discussed above, according to the processes of the first and second embodiments disclosed herein, the functionalizing compound is reacted with a reactive conjugated diene monomer-containing polymer. The reactive conjugated diene monomer-containing polymer may be prepared by various polymerization methods. As discussed in more detail below, various types of monomer, catalyst and solvent can be utilized in preparing the reactive conjugated diene monomer-containing polymer and a reactive polymer can include one initiated by an anionic initiator or a coordination catalyst system. The reactive polymer can also be described as a living or pseudo-living polymer.

In certain embodiments of the first and second embodiments disclosed herein, the reactive conjugated diene monomer-containing polymer is formed by anionic polymerization. Anionic polymerization of conjugated diene monomers that generally involves the use of an anionic initiator in combination with the monomer(s) and an optional solvent, the general process of which (i.e., other than the use of the functionalizing compound disclosed herein) is well known to those having skill in the art. Generally, the monomer or monomers are polymerized according to various suitable methods such as batch, semi-continuous, or continuous operations. The polymerization can also be carried out in a number of different polymerization reactor systems, including but not limited to bulk polymerization, vapor phase polymerization, solution polymerization, suspension polymerization, coordination polymerization, and emulsion polymerization; in solution polymerization, the concentration of the monomer(s) in the solution is preferably within a range of 5 to 50% by mass, more preferably 10 to 30% by mass. The polymerization system is not particularly limited and may be a batch system or a continuous system. In certain embodiments of the first and second embodiments disclosed herein, an anionic polymerization is conducted utilizing an anionic initiator, generally an organic alkaline metal compound, preferably a lithium-containing compound. Examples of lithium-containing compounds useful as anionic initiators include, but are not limited to, hydrocarbyl lithium compounds, lithium amide compounds, and similar sodium compounds. In certain embodiments of the first and second embodiments disclosed herein, the amount of the lithium compound used as the anionic initiator is preferably within a range of 0.2 to 20 millimoles per 100 g of the monomer. As discussed above, in certain embodiments, a functionalized initiator is utilized. Non-limiting examples of functionalized initiators include organic alkaline metal compounds (e.g., an organolithium compound) that additionally include one or more heteroatoms (e.g., nitrogen, oxygen, boron, silicon, sulfur, tin, and phosphorus atoms) or heterocyclic groups containing the foregoing, frequently one or more nitrogen atoms (e.g., substituted aldimines, ketimines, secondary amines, etc.) optionally pre-reacted with a compound such as diisopropenyl benzene. Many functional initiators are known in the art. Exemplary ones are disclosed in U.S. Pat. Nos. 5,153,159, 5,332,810, 5,329,005, 5,578,542, 5,393,721, 5,698,464, 5,491,230, 5,521,309, 5,496,940, 5,567,815, 5,574,109, 5,786,441, 7,153,919, 7,868,110 and U.S. Patent Application Publication No. 2011-0112263, which are incorporated herein by reference. In certain preferably embodiments when a functional initiator is utilized, the functional group added by the initiator is different from the functional group added by the functionalizing compounds disclosed herein.

Non-limiting examples of hydrocarbyl lithium compounds include ethyl lithium, n-propyl lithium, isopropyl lithium, n-butyl lithium, sec-butyl lithium, tert-octyl lithium, n-decyl lithium, phenyl lithium, 2-naphthyl lithium, 2-butylphenyl lithium, 4-phenyl-butyl lithium, cyclohexyl lithium, cyclopentyl lithium, a reaction product of diisopropenylbenzene and butyl lithium, and mixtures thereof. Among these, alkyl lithium compounds such as ethyl lithium, n-propyl lithium, isopropyl lithium, n-butyl lithium, sec-butyl lithium, tert-octyl lithium, n-decyl lithium and so on are preferable, and n-butyl lithium is particularly preferable. In certain embodiments of the first and second embodiments disclosed herein, the anionic polymerization is conducted in the absence of lanthanide compounds such as those used in coordination catalyst systems. Generally, the anionic polymerization is conducted using monomers in a hydrocarbon solvent inactive to the polymerization reaction, examples of which include hydrocarbon solvents such as aromatic hydrocarbon, aliphatic hydrocarbon, or cycloaliphatic hydrocarbon. Non-limiting examples of hydrocarbon solvents inactive to the polymerization reaction include propane, n-butane, isobutane, n-pentane, isopentane, n-hexane, cyclohexane, propene, 1-butene, isobutene, trans-2-butene, cis-2-butene, 1-pentene, 2-pentene, 1-hexene, 2-hexene, benzene, toluene, xylene, ethylbenzene, and mixtures thereof.

In certain embodiments of the first and second embodiments, the anionic polymerization process is carried out in the presence of a randomizer. The randomizer can control the microstructure of the conjugated diene compound, and has an action such that the 1,2-bond content in butadiene unit of the polymer using, for example, 1,3-butadiene as a monomer is controlled, and butadiene units and styrene units in the copolymer using 1,3-butadiene and styrene as a monomer are randomized, or the like. Non-limiting examples of the randomizer include dimethoxybenzene, tetrahydrofuran, linear and cyclic oligomeric oxolanyl alkanes such as 2,2-bis(2'-tetrahydrofuryl)propane, dimethoxyethane, diethylene glycol dibutyl ether, diethylene glycol dimethyl ether, bis tetrahydrofuryl propane, triethylamine, pyridine, N-methylmorpholine, N,N,N',N'-tetramethyl ethylenediamine, 1,2-dipiperidinoethane, potassium-t-amylate, potassium-t-butoxide, sodium-t-amylate and so on. The amount of the randomizer used is preferably within a range of 0.01 to 100 molar equivalents per 1 mol of the organic alkaline metal compound as a polymerization initiator.

The polymerization temperature in the anionic polymerization is preferably within a range of 0 to 150° C., more preferably 20 to 130° C. The polymerization may be carried out under a generating pressure or, preferably, at a pressure sufficient to keep the reaction monomers substantially in a liquid phase. When the polymerization reaction is carried out under a pressure higher than the generating pressure, the reaction system is preferably pressurized with an inert gas. Preferably, any reaction-obstructing substances, such as water, oxygen, carbon dioxide, protonic compounds, and the like are removed before beginning the polymerization reaction.

As mentioned above, in certain embodiments of the first and second embodiments disclosed herein, the reactive conjugated diene monomer-containing polymer is formed using a coordination catalyst system. Suitable coordination catalyst systems may comprise one, two, three or more component systems. In one or more embodiments of the first and second embodiments disclosed herein, the coordination catalyst system is formed by combining a heavy metal compound (e.g., a transition metal compound or a lanthanide compound), an alkylating agent (e.g., an organoaluminum compound), and optionally other co-catalyst components. Thus, in certain embodiments of the first and second embodiments disclosed herein, the process includes utilization of a coordination catalyst system comprising: (i) a transition metal compound or a lanthanide compound, (ii) an alkylating agent, and (iii) optionally other co-catalyst components. More specifically, various methods can be used to prepare a coordination catalyst system such as formatting in situ by separately adding the catalyst components to the monomer(s) to be polymerized in either a stepwise or continuous manner. In other embodiments, the coordination catalyst system may be preformed (i.e., the components of the catalyst system are pre-mixed outside the polymerization system either in the absence of any monomer(s) or in the presence of a small amount of monomer(s)) prior to addition to the monomer(s) to be polymerized; in certain such embodiments, the preformed coordination catalyst system is aged prior to adding to the monomer(s) to be polymerized.

Examples of coordination catalyst systems suitable for use in certain embodiments of the processes of the first and second embodiments disclosed herein include nickel-based systems, cobalt-based systems, and lanthanide-based systems. Details concerning useful nickel-based systems are disclosed in U.S. Pat. Nos. 6,479,601, 6,451,934, 4,562,172, 4,562,171, and 4,223,116, which are incorporated herein by reference. Useful cobalt-based systems are disclosed in U.S. Pat. Nos. 6,479,601, 4,954,125, 4,562,172, 4,562,171, and 4,522,988, which are incorporated herein by reference. Details concerning useful lanthanide-based catalyst systems are disclosed in U.S. Pat. Nos. 6,897,270, 7,094,849, 6,992,147, and 7,008,899, which are incorporated herein by reference; as well as U.S. Pat. Nos. 8,088,868, 7,879,952, 7,671,138 and 7,732,534, which are also incorporated herein by reference. In particular embodiments of the first and second embodiments, a lanthanide-based catalyst system is employed for polymerizing conjugated diene monomers into cis-1,4-polydienes. As is known in the art, these systems are effective in polymerizing conjugated diene monomer into high cis-1,4 polydienes.

When a coordination catalyst system is utilized in the processes of the first and second embodiments disclosed herein, it may be prepared in or provided in one or more solvents. Generally any solvent utilized for the coordination catalyst system will be a solvent inactive to the polymerization reaction, examples of which include hydrocarbon solvents such as an aromatic hydrocarbon, aliphatic hydrocarbon, or cycloaliphatic hydrocarbon. Non-limiting examples of hydrocarbon solvents inactive to the polymerization reaction include propane, n-butane, isobutane, n-pentane, isopentane, n-hexane, cyclohexane, propene, 1-butene, isobutene, trans-2-butene, cis-2-butene, 1-pentene, 2-pentene, 1-hexene, 2-hexene, benzene, toluene, xylene, ethylbenzene, and mixtures thereof.

According to the processes of the first and second embodiments disclosed herein, various conjugated diene monomers can be utilized to prepare the reactive conjugated diene monomer-containing polymer. As those of skill in the art understand, a conjugated diene is a compound that has two double carbon-carbon bonds (i.e., two —C═C— bonds) that are separated by a single bond (i.e., —C—C—); a conjugated diene will contain at least one —C═C—C═C— moiety). The particular structure of the conjugated diene monomer used in the embodiments of the first and second embodiments disclosed herein can vary. In certain embodiments of the first and second embodiments disclosed herein, the conjugated diene monomer comprises at least one of 1,3-butadiene; isoprene; 1-3-pentadiene; 2,3-dimethyl-1,3-butadiene; 2-ethyl-1,3-butadiene; 2-methyl-1,3-pentadiene; 3-methyl-1,3-pentadiene; 4-methyl-1,3-pentadiene; 2,4-hexadiene; 1,3-hexadiene; 1,3-cyclopentadiene; 1,3-cyclohexadiene; 1,3-cycloheptadiene; or 1,3-cyclooctadiene. In certain embodiments of the first and second embodiments, the conjugated diene monomer comprises 1,3-butadiene. In certain embodiments of the first and second embodiments disclosed herein, the reactive conjugated diene monomer-containing polymer further comprises at least one vinyl aromatic monomer) (i.e., in addition to the conjugated diene monomer). In certain embodiments of the first and second embodiments disclosed herein, the at least one vinyl aromatic monomer comprises at least one of styrene, alpha-methyl styrene, p-methylstyrene, o-methylstyrene, p-butylstyrene, vinylnaphthalene, p-tertbutylstyrene, 4-vinylbiphenyl, 4-vinylbenzocyclobutene, 2-vinylnaphthalene, 9-vinylanthracene, 4-vinylanisole, or vinyl catechol. In certain embodiments of the first and second embodiments disclosed herein, the at least one vinyl aromatic monomer comprises styrene. In certain embodiments of the first and second embodiments disclosed herein, the reactive conjugated diene monomer-containing polymer comprises polybutadiene or styrene-butadiene copolymer. In certain embodiments of the first and second embodiments wherein at least one conjugated diene monomer is used in combination with at least one vinyl aromatic monomer, they are utilized at a weight ratio of 95:5 to 50:50, including 95:5 to 65:35. In certain embodiments of the first and second embodiments wherein the reactive polymer comprises styrene-butadiene copolymer, the styrene content of the copolymer is about 10 to about 50% of weight of the total polymer, including 10-50% by weight, about 18 to about 40% by weight, and 18-40% by weight. In certain embodiments of the first and second embodiments wherein the reactive polymer comprises styrene-butadiene copolymer, the copolymer has a microstructure with about 8 to about 99% by mass vinyl bonds (1,2-vinyl) in the butadiene portion, including 8-99%, about 10 to about 60% and 10-60% by weight. The vinyl bond content in the butadiene portion of the copolymer can be determined by $H^1$-NMR and $C^{13}$-NMR (e.g., using a 300 MHz Gemini 300 NMR Spectrometer System (Varian).

According to the processes of the first and second embodiments disclosed herein, once a desired conversion of monomer(s) is achieved and end functionalization with the functionalizing compound has taken place, the polymerization can be stopped by terminating or coupling. In certain embodiments of the first and second embodiments, the polymerization is terminated by protonating the "living" end functionalized polymer by adding a compound that can donate a proton to the living end (i.e., a proton source). Non-limiting examples include water, and isopropyl and methyl alcohol, and any mixtures thereof. In certain embodiments of the first and second embodiments disclosed herein, after the polymerization has been stopped or quenched, the end functionalized polymer is recovered by utilizing conventional procedures of desolventization and/or drying. For instance, the polymer may be isolated from the solution by coagulation of the polymerization mixture with an alcohol such as methanol, ethanol, or isopropanol, followed by isolation, or by steam distillation of the solvent and the unreacted monomer, followed by isolation. The isolated polymer is then dried to remove residual amounts of solvent and water. Alternatively, the polymer may be isolated from the polymerization mixture by evaporating the solvent, such as by directly drum drying the polymerization cement.

In those embodiments where the polymer is coupled, various coupling agents may be utilized, including, but not limited to metal halides, metalloid halides, alkoxysilanes, alkoxystannanes, or a combination thereof. In one or more embodiments, metal halides or metalloid halides may be selected from the group comprising compounds expressed by the formula (1) $R^*nM^1Y_{(4-n)}$, the formula (2) $M^1Y_4$, and the formula (3) $M^2Y_3$, where each $R^*$ is independently a monovalent organic group having 1 to 20 carbon atoms, $M^1$ is a tin atom, silicon atom, or germanium atom, $M^2$ is a phosphorous atom, Y is a halogen atom, and n is an integer of 0-3. Exemplary compounds expressed by the formula (1) include halogenated organic metal compounds, and the compounds expressed by the formulas (2) and (3) include halogenated metal compounds.

The functionalized polymer produced by the processes of the first and second embodiment disclosed herein, has a number average molecular weight (Mn) of the end-functionalized copolymer that may vary. In certain embodiments of the first and second embodiments disclosed herein, functionalized polymer has a Mn of 80,000 to 1,000,000, preferably 100,000 to 500,000 grams/mole. The Mn values referred to herein are number average molecular weights which can be determined by using gel permeation chromatography (GPC) calibrated with polystyrene standards and Mark-Houwink constants for the polymer in question.

Processes for Preparing a Functionalizing Compound

As discussed above, according to the third embodiment disclosed herein, a process is disclosed for preparing a functionalizing compound. The process comprises reacting an alkoxysilane compound of formula (I) with a polyol of formula (II), to produce a functionalizing compound containing at least two —O—Si—O— moieties. According to the process, formulas (I) and (II) are as follows:

wherein each $R^1$ is independently selected from a halogen atom, and a monovalent organic group optionally substituted with at least one heteroatom, each $R^2$ is independently selected from hydrogen and a monovalent organic group, x is an integer from 2 to 4, $R^3$ is a multivalent organic group optionally substituted with at least one heteroatom, and y is an integer of at least 3. The meaning and structures of the alkoxysilane compound of formula (I), the polyol of formula (II) as well as the resulting functionalizing compound are as discussed above in preceding sections and should be considered to be fully applicable to the third and fourth embodiments disclosed herein as it fully set forth within the present section.

According to the process of the third embodiment disclosed herein, the functionalizing compound formed by pre-reacting the alkoxysilane compound of formula (I) with a polyol of formula (II) prior to adding the product thereof (i.e., the functionalizing compound) to a reactive conjugated diene monomer-containing polymer. In certain embodiments of the process of the third embodiment, the process further comprises the use of a catalyst to catalyze the reaction of the alkoxysilane compound with the polyol; in such embodiments various catalysts can be utilized such as those discussed below. In preferred embodiments of the process of the third embodiment, the process lacks any solvent (or is free of solvent). In other words, according to such processes, the functionalizing compound is produced without addition of any solvent. According to the process of the third embodiment, various reaction conditions can be utilized including temperatures of 100 to 180° C. for 0.1 to 1 hour. According to the process of the third embodiment, the relative amounts of alkoxysilane compound and polyol utilized may vary although preferably a molar excess of alkoxysilane is utilized; in certain such embodiments, the molar ratio of alkoxysilane compound to polyol is 2:1 to 8:1, preferably 2:1 to 4:1. As illustrated in the working examples provided herein, changing the relative amounts of alkoxysilane compound to polyol can change the structure of the resulting functionalizing compound; generally, increasing the amount of alkoxysilane compound (e.g., from 2.5:1 to 4:1) will result in relatively more alkoxysilane compounds adding to each polyol.

Suitable catalysts for the process of preparing the functionalizing compound include, but are not limited to, strong organic bases having a pKa in aqueous media of greater than about 10, a strong inorganic base, an alkyl tin catalyst, a zirconium catalyst, a titanium catalyst, and the like, and combinations thereof. For example, strong organic bases suitable for use as a catalyst preferably have a pKa in aqueous media of greater than about 10, more preferably greater than about 11 and, optimally, greater than about 12. Exemplary strong organic bases for use in the invention compounds include, but are not limited to, strong alkali metal alkoxides, such as sodium or potassium alkoxide; guanidines, such as triphenylguanidine (TPG), diphenylguanidine (DPG), di-o-tolylguanidine (DTG), N,N,N',N'- tetramethylguanidine (TMG), and the like; and hindered amine bases, such as 1,8-diazabicyclo[5.4.0]undec-7-ene (DBU), 1,5-diazabicyclo[4.3.0]non-5-ene (DBN), and the like, tertiary amine catalysts, such as N,N-dimethylcyclohexylamine, triethylenediamine, triethylamine, and the like, quaternary ammonium bases, such as tetrabutylammonium hydroxide, bis-aminoethers, such as bis(dimethylaminoethyl)ethers, and the like, nitrogen-containing heterocycles such as, but not limited to, such heterocycles having from 5 to 7 ring members. A non-limiting example of a nitrogen-containing heterocycle is a substituted or unsubstituted imidazole such as, but not limited to, imidazole, 4-ethylamino imidazole, 2-mercapto-1-methyl imidazole, 1-methyl imidazole, 2,4,5-triphenyl imidazole, 2-methyl imidazole, 2-ethyl-4-methyl imidazole, 2-heptadecyl imidazole, and the like. Suitable catalysts can further include alkyl tin compounds such as, but not limited to, butyl tin tris(2-ethyl-hexanoate), bis(2-ethyl-hexanoate) tin, butyl tin chloride dihydroxide, butyl tin hydroxide oxide hydrate, dibutyl tin dilaurate, dibutyl tin dimaleate, dibutyl tin oxide, and the like. Additional suitable catalysts can further include zirconium compounds. Examples of suitable zirconium catalysts include, but are not limited to, zirconium 2-ethylhexanoate, zirconium tetrakis-(2-ethylhexanoate), tetraoctyl zicronate, zirconium n-butoxide, zirconium t-butoxide, zirconium di-n-butoxide (bis-2,4-pentanedionate), zirconium diisopropoxide bis(2,2,6,6-tetramethyl-3,5-heptanedionate), zirconium ethoxide, zirconium 2-ethylhexoxide, zirconium 3,5-heptanedionate, zirconium isopropoxide, zirconium 2-methyl-2-butoxide, zirconium 2,4-pentanedionate, zirconium n-propoxide, and the like. A catalytic amount of the zirconium compound can be about 0.01% to about 5% by weight, suitably about 0.05% to about 3% by weight, and about 0.1% to about 2% by weight, based on the weight of the silica. Additional suitable catalysts can further include titanium compounds. Examples of suitable titanium catalysts include, but are not limited to, titanium trimethylsiloxide, titanium (isopropoxide)$_2$(2,4-pentandionate)$_2$, titanium (butoxide)$_2$(2,4-pentandionate)$_2$, titanium (isopropoxide)$_2$(ethyl-acetoacetate)$_2$, and the like. Suitable catalysts can be mixtures of any of the above categories and subcategories.

The alkoxysilane compound of formula (I) and the polyol of formula (II) react in a process that involves addition of the alkoxysilane compound to the polyol via the loss of a hydrogen from an —OH of the polyol along with the loss of an alkoxy from the alkoxysilane. Overall, these losses result in the production of alcohol. The reaction results in a silicon of the alkoxysilane compound (i.e., a silicon that lost an alkoxy) being bonded to an oxygen of the polyol (i.e., the oxygen that lost a hydrogen). In certain embodiments of the process of the third embodiment, this reaction results in one alkoxysilane compound being added to one oxygen of a polyol and in other embodiments, one alkoxysilane compound may add across two separate oxygens of a polyol resulting in a cyclic structure in the functionalizing compound (which cyclic structure contains the two oxygens from the polyol, the silicon of the alkoxysilane as well as carbon atoms occurring in the $R^4$ or $R^6$ portion of the alkoxysilane and a nitrogen when the alkoxysilane is a diamine). As discussed above, the reaction of the alkoxysilane and the polyol produces alcohol as a by-product; this by-product can be evaporated away from the functionalizing compound. In certain embodiments of the third embodiment, the process further comprises removing the by-product alcohol that is generated from the reaction of the polyol and the alkoxysilane; the resulting (purified) product is a liquid.

Polymer Functionalizing Compound

As discussed above, the fourth embodiment disclosed herein is directed to a polymer functionalizing compound comprising the reaction product of an alkoxysilane compound of formula (I) with a polyol of formula (II) is disclosed. Formulas (I) and (II) are as follows:

$(R^1)_{4-x}Si(OR^2)_x$ (I)

$(R^3)(OH)_y$ (II)

wherein each $R^1$ is independently selected from a halogen atom, and a monovalent organic group optionally substituted with at least one heteroatom, each $R^2$ is independently selected from hydrogen and a monovalent organic group, x is an integer from 2 to 4, $R^3$ is a multivalent organic group optionally substituted with at least one heteroatom, and y is an integer of at least 3. The meaning and structures of the alkoxysilane compound of formula (I), the polyol of formula (II) as well as the resulting functionalizing compound are as discussed above in preceding sections and should be considered to be fully applicable to the third and fourth embodiments disclosed herein as it fully set forth within the present section.

EXAMPLES

The following examples illustrate specific and exemplary embodiments and/or features of the embodiments of the present disclosure. The examples are provided solely for the purposes of illustration and should not be construed as limitations of the present disclosure. Numerous variations over these specific examples are possible without departing from the spirit and scope of the presently disclosed embodiments. It should specifically be understood that alkoxysilanes, polyols, monomers and solvents that differ in relative amount, composition, or both from those used in the examples (i.e., as fully as disclosed in the preceding paragraphs) may be utilized and that accordingly, functionalized polymers that differ in structure from those produced in the examples may be produced (i.e., according to the description of the preceding paragraphs).

Example 1 (Preparation of Functionalizing Compound)

An exemplary functionalizing compound was prepared according to the following process. To a 100 milliliter flask was added 14.67 grams of 3-(1,3-dimethyl butylidene)aminopropyltriethoxysilane, 4.2 milliliters of N,N,N',N'-Tetrakis(2-hydroxyethyl)ethylenediamine, and 0.1 milliliter of titanium tertbutoxide (Ti(butoxide)$_4$). No solvent was utilized. The alkoxysilane compound was utilized in a molar ratio of 2.5 times the amount of polyol. Thereafter, the mixture was stirred at 150° C. for about 1-2 hours in order to allow the reaction to proceed and to allow for evaporation of the by-product ethanol. A schematic representation of the reaction of Example 1 is as follows:

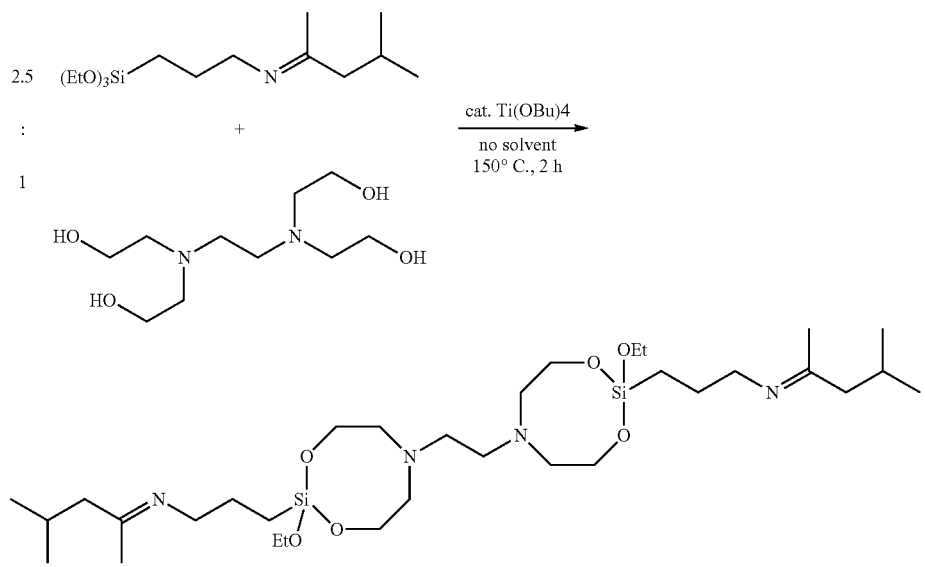

Example 2 (Preparation of Functionalizing Compound)

Another exemplary functionalizing compound was prepared according to the following process wherein the same starting ingredients, catalyst and reaction conditions were utilized, but the relative amount of alkoxysilane compound was increased so that the molar ratio of alkoxysilane compound to polyol was 4:1. To a 100 milliliter flask was added 12.14 grams of 3-(1,3-dimethyl butylidene)aminopropyltriethoxysilane, 2.1 milliliters of N,N,N',N'-Tetrakis(2-hydroxyethyl)ethylenediamine, and 0.1 milliliter of titanium tertbutoxide (Ti(butyl)$_4$). No solvent was utilized. Thereafter, the mixture was stirred at 150° C. for about 1-2 hours in order to allow the reaction to proceed and to allow for evaporation of the by-product ethanol. A schematic representation of the reaction of Example 2 is as follows:

Example 3 (Synthesis of Control SBR)

A control non-functionalized styrene-butadiene copolymer (SBR) was prepared according to the following process. (The SBR that is produced can also be described as non-end functionalized since although it contains a proton at its end from use of a terminator it does not contain any end functional group.) To a two gallon (approximately 7.5 liter) N$_2$ purged reactor equipped with a stirrer was added 1.586 kilograms of hexane, 0.99 kilograms of 33.5 weight % styrene in hexane, and 2.906 kilograms of 20.6 weight % 1,3-butadiene in hexane. The reactor was charged with 3.92 milliliters of n-butyllithium (1.59 Molar in hexane), followed 1.20 milliliters of 2,2-bis(2'-tetrahydrofuryl)propane (1.6 Molar in hexane), and the reactor jacket was heated to 50° C. After 35 minutes, the batch temperature peaked at

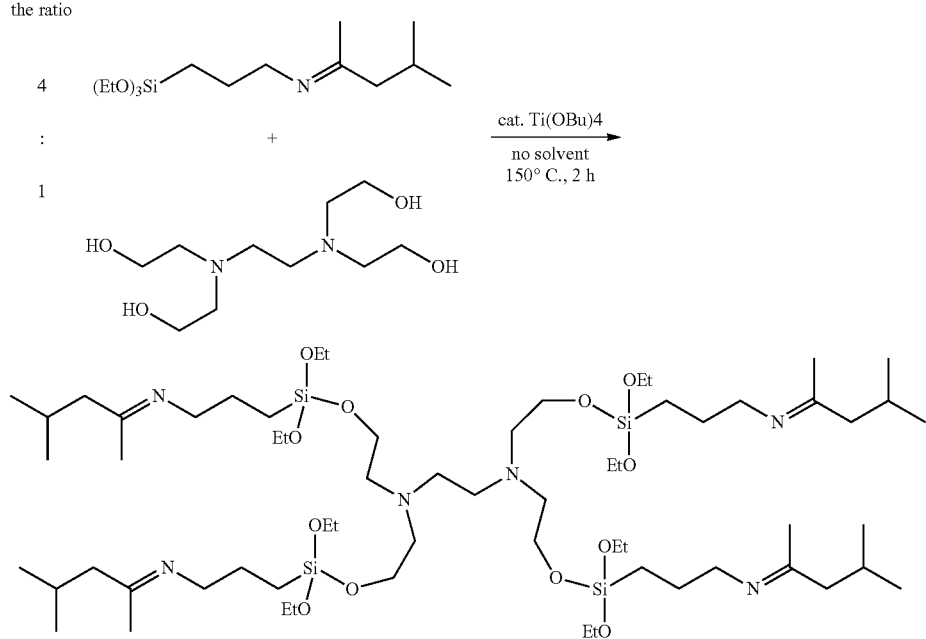

63.8° C. After an additional 30 minutes, the polymer cement was dropped into dried 28-oz glass bottles and the reaction was terminated by adding 2 milliliters of isopropyl alcohol.

Example 4 (Synthesis of Control SBR)

A control functionalized styrene-butadiene copolymer was prepared using an alkoxysilane without any polyol according to the following process. To a two gallon (approximately 7.5 liter) $N_2$ purged reactor equipped with a stirrer was added 1.586 kilograms of hexane, 0.99 kilograms of 33.5 weight % styrene in hexane, and 2.906 kilograms of 20.6 weight % 1,3-butadiene in hexane. The reactor was charged with 3.92 milliliters of n-butyllithium (1.59 Molar in hexane), followed 1.20 milliliters of 2,2-bis(2'-tetrahydrofuryl)propane (1.6 Molar in hexane), and the reactor jacket was heated to 50° C. After 35 minutes, the batch temperature peaked at 63.8° C. After an additional 30 minutes, the polymer cement was dropped into dried 28-oz glass bottles and 0.41 milliliters of 3-(1,3-dimethylbutylidene)aminopropyltriethoxysilane (1.0 Molar in hexane) was added to the reaction bottle to functionalize the live ends of the polymer. After approximately 30 minutes, the reaction was terminated by adding 2 milliliters of isopropyl alcohol.

Example 5 (Synthesis of End Functionalized SBR)

An exemplary end functionalized styrene-butadiene copolymer was prepared according to the following process using the functionalizing compound prepared in Example 1. To a two gallon (approximately 7.5 liter) $N_2$ purged reactor equipped with a stirrer was added 1.586 kilograms of hexane, 0.99 kilograms of 33.5 weight % styrene in hexane, and 2.906 kilograms of 20.6 weight % 1,3-butadiene in hexane. The reactor was charged with 3.92 milliliters of n-butyllithium (1.59 Molar in hexane), followed 1.20 milliliters of 2,2-bis(2'-tetrahydrofuryl)propane (1.6 Molar in hexane), and the reactor jacket was heated to 50° C. After 35 minutes, the batch temperature peaked at 63.8° C. After an additional 30 minutes, the polymer cement was dropped into dried 28-oz glass bottles and 0.41 milliliters of the functionalizing compound of Example 1 (1.0 Molar in hexane) was added to the reaction bottle to functionalize the live ends of the polymer. After approximately 30 minutes, the reaction was terminated by adding 2 milliliters of isopropyl alcohol.

Example 6 (Synthesis of End Functionalized SBR)

An exemplary end functionalized styrene-butadiene copolymer was prepared according to the following process using the functionalizing compound prepared in Example 2. To a two gallon (approximately 7.5 liter) $N_2$ purged reactor equipped with a stirrer was added 1.586 kilograms of hexane, 0.99 kilograms of 33.5 weight % styrene in hexane, and 2.906 kilograms of 20.6 weight % 1,3-butadiene in hexane. The reactor was charged with 3.92 milliliters of n-butyllithium (1.59 Molar in hexane), followed 1.20 milliliters of 2,2-bis(2'-tetrahydrofuryl)propane (1.6 Molar in hexane), and the reactor jacket was heated to 50° C. After 35 minutes, the batch temperature peaked at 63.8° C. After an additional 30 minutes, the polymer cement was dropped into dried 28-oz glass bottles and 0.41 milliliters of the functionalizing compound of Example 2 (1.0 Molar in hexane) was added to the reaction bottle to functionalize the live ends of the polymer. After approximately 30 minutes, the reaction was terminated by adding 2 milliliters of isopropyl alcohol.

The copolymers prepared according to Examples 3-6 were tested for certain properties according to the following procedures. Results are reported in Table 1. The Mooney viscosities disclosed herein were determined at 130° C. using an Alpha Technologies Mooney viscometer with a large rotor, a one minute warm-up time, and a four minute running time, and, hence are referred to as Mooney$_{1+4}$ or ML$_{1+4}$. More specifically, the Mooney viscosity was measured by preheating a sample from each batch to 130° C. for one minute before the rotor started. The Mooney viscosity was recorded for each sample as the torque at four minutes after the rotor started. The indexed viscosity values that appear in Table 1 were calculated by dividing the value for a given example by the value for control example 3 and multiplying by 100. The Mn values listed in Table 1 were measured using GPC calibrated with polystyrene standards and Mark-Houwink constants for the polymer in question (i.e., SBR). The % coupling was also measured by GPC. Cold flow testing was performed using a Williams' Parallel Plate Plastometer (from Scott™ Testers, Inc.) at room temperature (approximately 25° C.). Samples were prepared by melt pressing 15.5 grams of polymer at 100° C. under high pressure for 20 minutes in an Instron mold using a Carver Press. After cooling to room temperature, samples were removed from the press as cylindrical samples, having a diameter and height of uniform thickness of 40.0 mm and 13.0 mm, respectively. Samples were placed individually into the Scott plastometer under the weight of a 5 kg calibrated weight. Tests were conducted for 30 minutes (measured from time that the weight was released onto the sample), with sample height being recorded as a function of time. Sample height at the conclusion of the appropriate time (i.e., 30 minutes) generally is considered to be an acceptable indicator of cold flow resistance, with a higher value of this final height indicating a better cold flow resistance for the polymer. The T80 stress relaxation time (T80), was determined by measuring the time required (in minutes) from the moment when rotation was stopped immediately after measurement of the ML$_{1+4}$ at 130° C. that was required for the ML$_{1+4}$ value to decrease 80%. The nitrogen content was determined using NMR (using a 300 MHz Gemini 300 NMR Spectrometer System (Varian)).

TABLE 1

|  | Mn (grams/mole) | Coupling (%) | Indexed ML1 + 4 | T80 (minutes) | Cold flow (mm) |
| --- | --- | --- | --- | --- | --- |
| Example 3 | 163,000 | 0 | 100 | 1.10 | 8.0 |
| Example 4 | 169,000 | 13 | 124 | 1.20 | 9.0 |
| Example 5 | 161,000 | 23 | 160 | 1.68 | 10.0 |
| Example 6 | 157,000 | 23 | 159 | 1.70 | 10.1 |

As can be seen from a review of the data of Table 1, the copolymers of Examples 5 and 6 which are end functionalized with the functionalizing compound of Examples 1 and 2, respectively, have increased cold flow resistance as compared to the control copolymers of Examples 3 and 4.

Use of the SBR copolymers prepared in Examples 3-6 in rubber compositions. The copolymers produced in control Examples 3-4 and in working (inventive) Examples 5-6 were utilized to prepare rubber compositions according to the formulation set forth in Table 2 and the mixing procedure set forth in Table 3. The rubber compositions were denoted as A-D, corresponding to the use of copolymers from Examples 3-6, respectively. Rubber compositions A and B are control examples and rubber compositions C and D are inventive examples.

TABLE 2

| Ingredient and Stage | Amount (phr) |
|---|---|
| Masterbatch | |
| Copolymer of Example 3, 4, 5, or 6 | 80 |
| Natural rubber | 20 |
| Silica | 55 |
| Silane (bifunctional, sulfur-containing organosilane) | 5 |
| Wax | 2 |
| Processing oil[1] | 10 |
| Stearic acid | 2 |
| 6PPD[2] | 0.95 |
| Re-mill | |
| Final | |
| Zinc oxide | 2.5 |
| TBBS[3] | 0.7 |
| MBTS[4] | 2 |
| DPG5 | 1.4 |
| Sulfur | 1.5 |

[1]Naphthenic oil (having IP 346 polycyclic aromatic content <2%)
[2]N-phenyl-N'-(l,3-di-methylbutyl)-p-phenylenediamine
[3]N-t-butylbenzothiazole-2-sulfenamide
[4]2,2'-diothiobisbenzothiazole
5N,N'-diphenylguanidine

TABLE 3

| Mixing Parameters | | |
|---|---|---|
| Stage | Time | Condition |
| Master Batch Stage (initial temp: 110° C., rotor rpm started at 80) | 0 seconds 30 seconds | Charge polymers Charge oil, silica filler and other master-batch ingredients, increase rotor speed to 80 rpm Drop based on max temperature of 180° C. or 5 minutes mixing (whichever comes first) |
| Remill Stage (initial temp: 110° C., rotor rpm at 80) | 0 seconds | Charge Master Batch Drop based on max temperature of 180° C. or 2 minutes mixing (whichever comes first) |
| Final Batch Stage (initial temp: 80, rotor rpm at 50) | 0 seconds 0 seconds | Charge Remill Charge curatives Drop based on max temperature of 110° C. or 2 minutes mixing (whichever comes first) |

After preparation of rubber compositions A-D, certain properties were measured using the following procedures. Results are provided in Table 4 below. The bound rubber content test was used to determine the percent of polymer bound to filler particles in each rubber composition. Bound rubber was measured by immersing small pieces of each uncured rubber composition in a large excess of toluene for three days. The soluble rubber was extracted from the sample by the solvent. After three days, any excess toluene was drained off and the sample was air dried and then dried in an oven at approximately 100° C. to a constant weight. The remaining pieces form a weak coherent gel containing the filler and some of the original rubber. The amount of rubber remaining with the filler is the bound rubber. The bound rubber content is then calculated according to the following:

$$\% \text{ Bound Rubber} = \frac{100\,(Wd - F)}{R}$$

where Wd is the weight of dried gel, F is the weight of filler in gel or solvent insoluble matter (same as weight of filler in original sample), and R is the weight of polymer in the original sample. The bound rubber percentage provides a means of measuring the interaction between the rubber (polymer) within a rubber composition and the filler, with relatively higher percentages of bound rubber indicating increased and beneficial interaction between the rubber (polymer) and filler.

Tan δ values were measured using a dynamic compression test done with a Dynastat™ mechanical spectrometer (Dynastatics Instruments Corp.; Albany, N.Y.) using a cylindrical button geometry test specimen (7.8 mm diameter×6 mm height). The temperature was held constant at the desired temperature of 50° C. The sample was compressed under a static load of 2 kg before testing. After it reached an equilibrium state, the test started with a dynamic compression load of 1.25 kg at a frequency of 15 Hz. The sample was then dynamically compressed and then extended and the resultant hysteresis (tan δ) was then recorded; values in Table 4 are at 10% strain. A rubber composition's tan δ at 50° C. is indicative of its rolling resistance when incorporated into a tire tread. The indexed tan δ values that appear in Table 4 were calculated by dividing the value for the composition in question (i.e., B, C or D) by the value for the control composition A and multiplying by 100; thus, a value less than 100 indicates a decrease in tan δ at 50° C. which is generally desirable.

TABLE 4

| | Indexed Bound Rubber | Indexed tan δ at 50° C. |
|---|---|---|
| Composition A | 100 | 100 |
| Composition B | 150 | 70 |
| Composition C | 152 | 68 |
| Composition D | 153 | 69 |

As can be seen from an evaluation of the data in Table 4, the use of the inventive functionalized SBR copolymers (i.e., from Examples 5 and 6) in rubber compositions C and D resulted in a desirable decrease in tan δ at 50° C. which would be indicative of decreased rolling resistance if the rubber compositions were utilized in a tire tread. Similarly, as to the bound rubber % for compositions C and D resulted in a desirable increase.

This application discloses several numerical range limitations that support any range within the disclosed numerical ranges, even though a precise range limitation is not stated verbatim in the specification, because the embodiments of the compositions and methods disclosed herein could be practiced throughout the disclosed numerical ranges. With respect to the use of substantially any plural or singular terms herein, those having skill in the art can translate from the plural to the singular or from the singular to the plural as is appropriate to the context or application. The various singular or plural permutations may be expressly set forth herein for sake of clarity.

It will be understood by those within the art that, in general, terms used herein, and especially in the appended claims are generally intended as "open" terms. For example, the term "including" should be interpreted as "including but not limited to," the term "having" should be interpreted as "having at least," the term "includes" should be interpreted as "includes but is not limited to." It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All references, including but not limited to patents, patent applications, and non-patent literature are hereby incorporated by reference herein in their entirety.

While various aspects and embodiments of the compositions and methods have been disclosed herein, other aspects and embodiments will be apparent to those skilled in the art. The various aspects and embodiments disclosed herein are for purposes of illustration and are not intended to be limiting, with the true scope and spirit being indicated by the claims.

What is claimed is:

1. A process for preparing a functionalized polymer, the process comprising
   (a) pre-reacting an alkoxysilane compound of formula (I)

with a polyol of formula (II)

wherein each $R^1$ is independently selected from a halogen atom, and a monovalent organic group optionally substituted with at least one heteroatom, each $R^2$ is independently selected from hydrogen and a monovalent organic group, x is an integer from 2 to 4, $R^3$ is a multivalent organic group optionally substituted with at least one heteroatom, and y is an integer of 4,
   to produce a functionalizing compound containing at least two —O—Si—O— moieties and having formula (III), (IV), or (V), as follows:

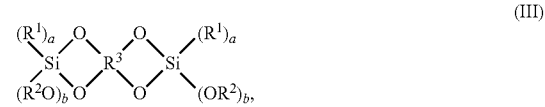

wherein a is an integer selected from 0 or 1, b is an integer selected from 1 or 2 and a+b=2,

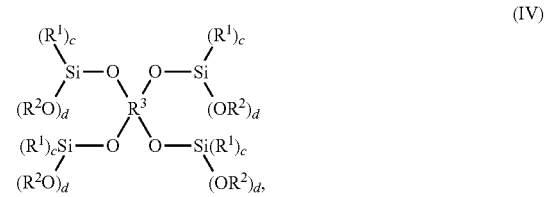

wherein c is an integer selected from 0 or 1, d is an integer selected from 1, 2 or 3, and c+d=3,

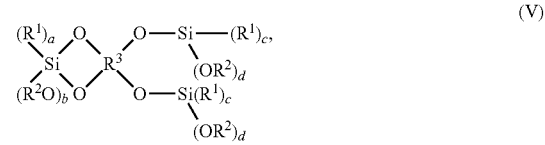

wherein a is an integer selected from 0 or 1, b is an integer selected from 1 or 2, a+b=2, c is an integer selected from 0 or 1, d is an integer selected from 1 or 2, and c+d=3, and (b) reacting the functionalizing compound with a reactive conjugated diene monomer-containing polymer,
thereby producing a polymer end functionalized with the functionalizing compound.

2. The process of claim 1, wherein the functionalizing compound has formula (III).

3. The process of claim 1, wherein at least one $R^1$, $R^3$, or a combination thereof contains at least one nitrogen.

4. The process of claim 1, wherein $R^3$ comprises a diamine and the polyol has the formula $[(OH)_q R^4]_r (R^7)_p NR^5 N(R^8)_s [R^6(OH)_t]_u$, wherein $R^4$, $R^6$, $R^7$, and $R^8$, are independently selected from multivalent organic groups optionally substituted with at least one heteroatom; $R^5$ is a multivalent organic group optionally substituted with at least one heteroatom; q and t are each an integer independently selected from 1 to 3; p, r, s and u are each an integer independently selected from 0, 1 or 2; r and p total 2; s and u total 2; and the total of all (OH) present is 4.

5. The process of claim 1, wherein $R^3$ contains at least one heteroatom selected from N, O, and S.

6. The process of claim 1, wherein at least one monovalent organic group of $R^1$ or $R^2$ comprises an alkyl, cycloalkyl, substituted cycloalkyl, alkenyl, cycloalkenyl, substituted cycloalkenyl, aryl, allyl, substituted aryl, aralkyl, alkaryl, alkynyl, or epoxy.

7. A process for preparing a functionalized polymer, the process comprising
   (a) providing a functionalizing compound having formula (III), (IV), or (V), as follows:

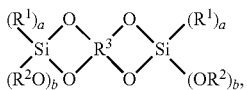
(III)

wherein a is an integer selected from 0 or 1, b is an integer selected from 1 or 2 and a+b=2,

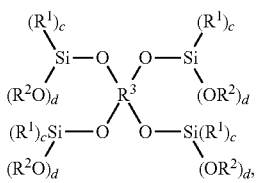
(IV)

wherein c is an integer selected from 0 or 1, d is an integer selected from 1, 2 or 3, and c+d=3,

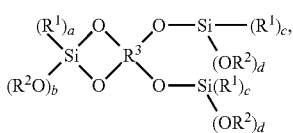
(V)

wherein a is an integer selected from 0 or 1, b is an integer selected from 1 or 2, a+b=2, c is an integer selected from 0 or 1, d is an integer selected from 1 or 2, and c+d=3, (b) reacting the functionalizing compound with a reactive conjugated diene-monomer containing polymer,
thereby producing a polymer end functionalized with the functionalizing compound.

8. The process of claim 7, wherein at least one $R^1$, $R^3$, or a combination thereof contains at least one nitrogen.

9. The process of claim 7, wherein $R^3$ comprises a diamine and the polyol has the formula $[(OH)_q R^4]_r (R^7)_p NR^5 N(R^8)_s [R^6(OH)_t]_u$, wherein $R^4$, $R^6$, $R^7$, and $R^8$, are independently selected from multivalent organic groups optionally substituted with at least one heteroatom; $R^5$ is a multivalent organic group optionally substituted with at least one heteroatom; q and t are each an integer independently selected from 1 to 3; p, r, s and u are each an integer independently selected from 0, 1 or 2; r and p total 2; s and u total 2; and the total of all (OH) present is 4.

10. The process of claim 7, wherein $R^3$ contains at least one heteroatom selected from N, O, and S.

11. The process of claim 7, wherein at least one monovalent organic group of $R^1$ or $R^2$ comprises an alkyl, cycloalkyl, substituted cycloalkyl, alkenyl, cycloalkenyl, substituted cycloalkenyl, aryl, allyl, substituted aryl, aralkyl, alkaryl, alkynyl, or epoxy.

12. The process of claim 7, wherein the reactive conjugated diene monomer-containing polymer comprises at least one of 1,3-butadiene; isoprene; 1-3-pentadiene; 2,3-dimethyl-1,3-butadiene; 2-ethyl-1,3-butadiene; 2-methyl-1,3-pentadiene; 3-methyl-1,3-pentadiene; 4-methyl-1,3-pentadiene; 2,4-hexadiene; 1,3-hexadiene; 1,3-cyclopentadiene; 1,3-cyclohexadiene; 1,3-cycloheptadiene; or 1,3-cyclooctadiene and optionally at least one vinyl aromatic monomer.

13. The process of claim 12, wherein the at least one vinyl aromatic monomer is present and comprises at least one of styrene, alpha-methyl styrene, p-methylstyrene, o-methylstyrene, p-butylstyrene, vinylnaphthalene, p-tertbutylstyrene, 4-vinylbiphenyl, 4-vinylbenzocyclobutene, 2-vinylnaphthalene, 9-vinylanthracene, 4-vinylanisole, or vinyl catechol.

14. The process of claim 7, wherein the polymer end functionalized with the functionalizing compound comprises at least one polymer chain bonded to the functionalizing compound through a Si.

15. The process of claim 1, wherein the functionalizing compound has formula (IV).

16. The process of claim 1, wherein the functionalizing compound has formula (V).

17. The process of claim 7, wherein the functionalizing compound has formula (III).

18. The process of claim 7, wherein the functionalizing compound has formula (IV).

19. The process of claim 7, wherein the functionalizing compound has formula (V).

* * * * *